United States Patent
Villele et al.

(10) Patent No.: US 10,600,328 B2
(45) Date of Patent: Mar. 24, 2020

(54) AIRCRAFT SYSTEMS AND METHODS FOR APPROACH STABILIZATION

(71) Applicant: HONEYWELL INTERNATIONAL INC., Morris Plains, NJ (US)

(72) Inventors: Dorothee De Villele, Haute-Garonne (FR); Sharanabasappa Advani, Karnataka (IN); Rajesh Chaubey, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 185 days.

(21) Appl. No.: 15/791,970

(22) Filed: Oct. 24, 2017

(65) Prior Publication Data

US 2019/0122569 A1 Apr. 25, 2019

(51) Int. Cl.
*G08G 5/02* (2006.01)
*G05D 1/06* (2006.01)
(Continued)

(52) U.S. Cl.
CPC ........... *G08G 5/02* (2013.01); *B64D 45/04* (2013.01); *G01C 23/00* (2013.01); *G05D 1/0676* (2013.01);
(Continued)

(58) Field of Classification Search
CPC ........ G08G 5/02; G08G 5/0021; G08G 5/025; G05D 1/0676; B64D 45/04; G01C 23/00
See application file for complete search history.

(56) References Cited

U.S. PATENT DOCUMENTS 7,212,135 B1 5/2007 Lynch et al.
8,116,923 B2 2/2012 Ishihara et al.
(Continued)

FOREIGN PATENT DOCUMENTS

EP 1462767 A1 9/2004
EP 2993657 A1 3/2016
EP 3182395 A1 6/2017

OTHER PUBLICATIONS

Tarnowski E.; From NonPrecision Approaches to Precision-Like Approaches: Methods and Operational Procedures; www.flightsafety. org, 2007.
(Continued)

*Primary Examiner* — Nicholas K Wiltey
*Assistant Examiner* — Tiffany K Luu
(74) *Attorney, Agent, or Firm* — Lorenz & Kopf, LLP

(57) ABSTRACT

An enhanced flight management system and flight management method directed to improved guidance in unstable approach scenarios. The method includes receiving and processing a published arrival procedure (PAP), a published glide path (PGP), landing parameters, and real-time aircraft sensor data to determine a an actual approach profile, and whether the aircraft is following the reference approach profile. Approach stabilization criterion are determined, including, (i) a wind corrected air mass flight path angle (WC FPA) at the IMC; (ii) a vertical speed at the wind corrected air mass flight path angle (VS IMC); (iii) a wind corrected air mass flight path (WC FPA) angle at the VMC; and (iv) a vertical speed at the wind corrected air mass flight path angle (VS VMC). The method also determines whether an IMC criterion profile and a VMC criterion profile stabilizes the actual approach.

17 Claims, 6 Drawing Sheets

(51) Int. Cl.
    *B64D 45/04*     (2006.01)
    *G08G 5/00*     (2006.01)
    *G01C 23/00*     (2006.01)

(52) U.S. Cl.
    CPC .......... *G08G 5/0021* (2013.01); *G08G 5/025* (2013.01); *G08G 5/0026* (2013.01)

(56) References Cited

U.S. PATENT DOCUMENTS

| | | | |
|---|---|---|---|
| 9,423,799 B1* | 8/2016 | Wu | G05D 1/042 |
| 9,440,747 B1 | 9/2016 | Welsh et al. | |
| 2006/0195235 A1 | 8/2006 | Ishihara et al. | |
| 2013/0218374 A1 | 8/2013 | Lacko et al. | |
| 2016/0090193 A1* | 3/2016 | He | B64D 45/04 |
| | | | 340/971 |
| 2017/0168658 A1* | 6/2017 | Lacko | G01C 23/005 |
| 2017/0301247 A1 | 10/2017 | Sherry et al. | |

OTHER PUBLICATIONS

Wang Z, et al.; A Methodology for Nowcasting Unstable Approaches; George Mason University Fairfax, VA, 2016.

Flight Safety Foundation Editorial Staff; Flight Safety Digest: Stabilized Approach and Flare are Keys to Avoiding Hard Landings, Aug. 2004.

Unstable Approaches: Risk Mitigation Policies, Procedures and Best Practices 2nd Edition; International Air Transport Association, Montreal-Geneva, 2016.

European Patent and Trademark Office, European Extended Search Report for Application No. EP18202169.1 dated Mar. 22, 2019.

\* cited by examiner

AIRCRAFT SYSTEMS AND METHODS FOR APPROACH STABILIZATION

TECHNICAL FIELD

The present invention generally relates to aircraft guidance systems, and more particularly relates to determining approach stabilization criterion and providing approach guidance based thereon.

BACKGROUND

Information from diverse data sources may be relied upon to assist a pilot in performing functions related to, for example, flight planning, performance management, and guidance and navigation. The easier it is for the pilot to obtain and synthesize the information provided by these diverse data sources, the more likely that the pilot will be able to successfully navigate the aircraft. Various management systems, such as flight management systems (FMS) may be utilized to assist a pilot with the collection and processing of information based on the data from the diverse data sources.

Navigating the descent phase of flight can be very cognitively demanding. In particular, scenarios in which an aircraft is in the approach phase of flight, all drag devices (for example, flaps and slats) of the aircraft are deployed, an airbrake and/or landing gear is deployed, and the approach is determined to be unstable, a pilot may wish to have guidance. However, guidance provided by the flight management system (FMS) and Flight Controls in this scenario may be incomplete. As a result, a crew may resort to an ad-hoc or rule of thumb analysis to determine whether and how to continue to land from the unstable approach. A rule of thumb analysis may inaccurately take into account all significant factors, such as, for example, a vertical speed and anticipated deceleration required to stabilize the aircraft and converge back onto a reference approach profile.

Accordingly, improvements to conventional FMS that improve approach guidance are desirable. Specifically, technologically improved flight management systems and methods capable of providing improved approach stabilization guidance are desirable. The desired improved flight management system provides a best possible vertical speed for stabilizing the aircraft at a selected stabilization altitude. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method for providing approach stabilization guidance for an aircraft is provided. The method comprising: at a control module, receiving a published arrival procedure (PAP) and a published glide path (PGP); receiving landing parameters comprising instrument meteorological conditions (IMC), and visual meteorological conditions (VMC); receiving real-time aircraft sensor data; processing the PAP, PGP, landing parameters, and sensor data, to determine, a reference approach profile, an actual approach profile, whether the aircraft is following the reference approach profile, and approach stabilization criterion comprising, (i) a wind corrected air mass flight path angle (WC FPA) at the IMC, (ii) a vertical speed at the wind corrected air mass flight path angle (VS IMC), (iii) a wind corrected air mass flight path angle (WC FPA) at the VMC, and (iv) a vertical speed at the wind corrected air mass flight path angle (VS VMC); determining, based on the vertical speed at WC FPA IMC, whether (a) an IMC criterion profile (taking into account the VS IMC and anticipated deceleration required to stabilize the aircraft, and converge back onto the reference approach profile) stabilizes the actual approach; determining, based on the vertical speed at WC FPA VMC, whether (b) a VMC criterion profile (taking into account the VS IMC and anticipated deceleration required to stabilize the aircraft and converge back onto the reference approach profile) stabilizes the actual approach; commanding a display system to display the approach stabilization criterion; and in response to conditions (a) and (b) occurring concurrently, commanding the display system to display "stable;" and allowing user selections responsive to the displayed approach stabilization criterion.

Also provided is a control module for an enhanced flight management system on an aircraft, comprising: a memory device; and a processor coupled to the memory device, the processor configured to: receive a flight plan comprising published arrival procedures (PAP), and a published glide path (PGP); receive landing parameters comprising a an instrument meteorological conditions (IMC) altitude, and a visual meteorological conditions (VMC) altitude; process the flight plan and landing parameters with aircraft specific data, and real-time sensor data to determine approach stabilization criterion comprising, (i) a wind corrected air mass flight path angle (WC FPA) at the IMC, (ii) a vertical speed at the wind corrected air mass flight path angle (VS IMC), (iii) a wind corrected air mass flight path (WC FPA) angle at the VMC, and (iv) a vertical speed at the wind corrected air mass flight path angle (VS VMC); determine, based on the vertical speed at WC FPA IMC, whether (a) an IMC criterion profile stabilizes the actual approach; determine, based on the vertical speed at WC FPA VMC, whether (b) a VMC criterion profile stabilizes the actual approach; and in response to conditions (a) and (b) occurring concurrently, commanding a display system to display "stable."

An embodiment of an enhanced flight management system on an aircraft is provided, comprising: a display system; a control module coupled to the display system, the control module comprising: a memory device; and a processor coupled to the memory device, the processor configured to: receive a flight plan comprising published arrival procedures (PAP), and a published glide path (PGP); receive landing parameters comprising a an instrument meteorological conditions (IMC) altitude, and a visual meteorological conditions (VMC) altitude; process the flight plan and landing parameters with aircraft specific data, and real-time sensor data to determine approach stabilization criterion comprising, (i) a wind corrected air mass flight path angle (WC FPA) at the IMC; (ii) a vertical speed at the wind corrected air mass flight path angle (VS IMC); (iii) a wind corrected air mass flight path (WC FPA) angle at the VMC; and (iv) a vertical speed at the wind corrected air mass flight path angle (VS VMC); determine, based on the vertical speed at WC FPA IMC, whether (a) an IMC criterion profile stabilizes the actual approach; determine, based on the vertical speed at WC FPA VMC, whether (b) a VMC criterion profile stabilizes the actual approach; in response to conditions (a) and (b) occurring concurrently, command the display system to display "stable;" and allow user selections responsive to the approach stabilization criterion; and upon neither condition (a) or condition (b), command the display system to prompt "unstable;" and prevent user selections responsive to the approach stabilization criterion.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), and may be separate from, or integrated within, a preexisting mobile platform management system, avionics system, or aircraft flight management system (FMS).

Exemplary embodiments of the disclosed control module for approach stabilization in an enhanced Flight Management Systems (FMS) provide a technological improvement over a conventional FMS, by processing and displaying additional information, specifically selectable guidance options that incorporate vertical speed at various stabilization altitudes. In operation, the novel control module for approach stabilization in a FMS (shortened herein to "control module for approach stabilization," or simply, "control module" 104) receives and processes conditions such as, a current phase of flight, a published arrival procedures (PAP), a published glide path (PGP), an instrument meteorological conditions (IMC) altitude, a visual meteorological conditions (VMC) altitude, a target approach airspeed (Vapp), aircraft specific data, and real-time sensor data. The control module 104 determines when current conditions indicate an unstable approach, determines approach stabilization criteria, and, based thereon, generates and displays approach guidance information on a display system 122. The control module 104 is further configured to receive user selections determined to be responsive to the guidance information, and to adjust the aircraft's actual flight path responsive thereto. The control module 104 is directed to assisting a pilot or crew in a period of descent prior to when the Enhanced Ground Proximity Warning System (EGPWS) engages.

Figure 1:
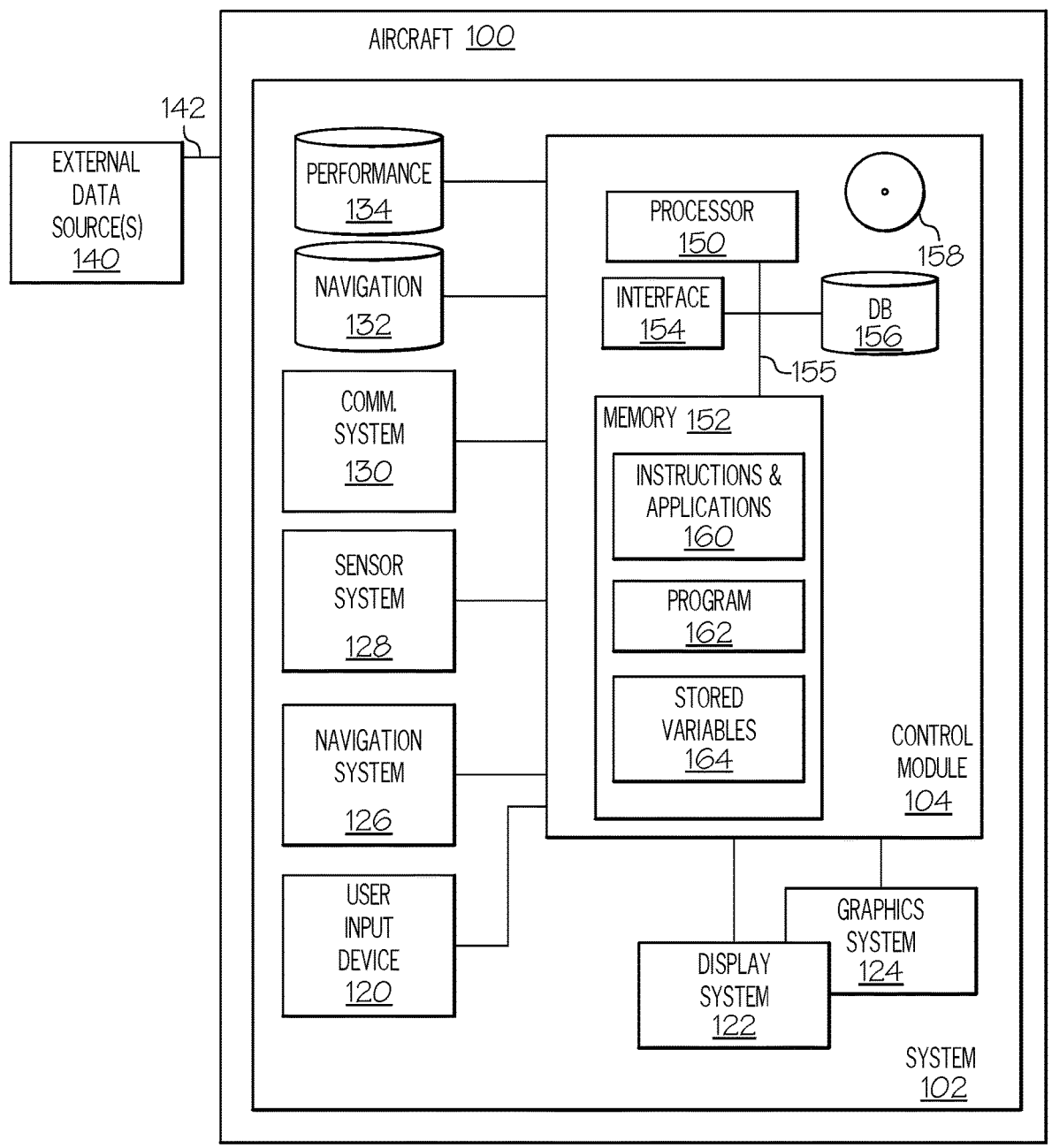
FIG. 1 is a block diagram of a system for approach stabilization, according to an exemplary embodiment.

Turning now to FIG. 1, a functional block diagram of an aircraft 100 including an enhanced flight management system 102 (shortened herein to "system" 102) employing the control module 104 that determines approach stabilization criterion. In the depicted embodiment, the system 102 includes: the control module 104 that is operationally coupled to a communication system 130, a sensor system 128, a navigation system 126, a user input device 120, a display system 122, and a graphics system 124. The operation of these functional blocks is described in more detail below. It will be appreciated that the system 102 may differ from the embodiment depicted in FIG. 1. For example, the system 102 can part of a vehicle management system or aircraft flight deck display. In the described embodiments, the depicted control module 104 is generally realized as a technologically enhanced flight management system (FMS) of an aircraft 100; however, the concepts presented here can be deployed in a variety of mobile platforms, spacecraft, and the like. Accordingly, in various embodiments, rather than enhancing a flight management system (FMS), the control module 104 may reside elsewhere and/or enhance part of larger avionics management system, or aircraft management system.

In the illustrated embodiment, the control module 104 is coupled to the communications system 130, which is configured to support communications via communications link 142, between external data source(s) 140 and the aircraft. External source(s) 140 may comprise air traffic control (ATC), or other suitable command centers and ground locations. Communications link 142 may be wireless, utilizing one or more industry-standard wireless communication protocols. Non-limiting examples of data received from the external source(s) 140 includes, for example, instantaneous (i.e., real time or current) air traffic control (ATC) communications and weather communications. In this regard, the communications system 130 may be realized using a radio communication system or another suitable data link system.

The sensor system 128 comprises a variety of different sensors, each directed to sensing a respective different aspect of the aircraft 100 while in flight. Non-limiting examples of sensors include: inertial reference sensors capable of obtaining or otherwise determining the attitude or orientation (e.g., the pitch, roll, and yaw, heading) of the aircraft 100 relative to earth; wind direction and velocity sensors, fuel-level sensors, engine temperature sensors, system status sensors for systems such as brakes, flaps, lights, and the like. Real-time aircraft sensor data includes, but is not limited to: aircraft location, position, orientation, attitude, and altitude.

Navigation system 126 is configured to provide real-time navigational data and/or information regarding operation of the aircraft. The navigation system 126 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 126, as will be appreciated in the art. The navigation system 126 is capable of obtaining and/or determining the current or instantaneous position and location information of the aircraft (e.g., the current latitude and longitude) and the current altitude or above ground level for the aircraft. In some embodiments, the inertial reference sensors described in connection with the sensor system 128 are included within the navigation system 126. In some embodiments, the navigation database 132 is integrated into the navigation system 126.

The user input device 120 is coupled to the control module 104, and the user input device 120 and the control module 104 are cooperatively configured to allow a user (e.g., a pilot, co-pilot, or crew member) to interact with the display system 122 and/or other elements of the system 102 in a conventional manner. The user input device 120 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 120 may be integrated with a display device in display system 122. Non-limiting examples of uses for the user input device 120 include: entering values for stored variables 164, loading or updating instructions and applications 160, and loading and updating the contents of the database 156, each described in more detail below. In addition, pilots or crew may enter Standard Operating Procedures (SOP), IMC altitude, VMC altitude, and the like, via the user input device 120.

The control module 104 is configured to generate commands that direct the renderings of the display system 122. The renderings of the display system 122 may be processed, at least in part, by the graphics system 124. In some embodiments, the graphics system 124 may be integrated within the control module 104; in other embodiments, the graphics system 124 may be integrated within the display system 122. Regardless of the state of integration of these subsystems, responsive to receiving display commands from the control module 104, the display system 122 displays, renders, or otherwise conveys one or more graphical representations or displayed images associated with operation of the aircraft 100, as described in greater detail below. In various embodiments, images displayed on the display system 122 may also be responsive to processed user input that was received via a user input device 120.

In general, the display system 122 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 122 may be part of, or include, a primary flight display (PFD) system, a panel-mounted head down display (HDD), a head up display (HUD), or a head mounted display system, such as a "near to eye display" system. The display system 122 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

The navigation database 132 comprises various flight planning and conventional adjustments for different phases of flight and different approach types. The performance database 134 comprises aircraft 100 specific drag and thrust models for use in the wind corrected (WC) flight path angle (FPA), the vertical airspeed (velocity) determinations, and an aircraft's ability to decelerate within a given amount of time, described in more detail below.

As mentioned, the control module 104 performs the functions of the system 102. With continued reference to FIG. 1, within the control module 104, the processor 150 and the memory 152 (having therein the program 162) form a novel processing engine that performs the described processing activities in accordance with the program 162, as is described in more detail below.

The control module 104 includes an interface 154, communicatively coupled to the processor 150 and memory 152 (via a bus 155), database 156, and an optional storage disk 158. In various embodiments, the control module 104 performs actions and other functions in accordance with steps of a method 600 described in connection with FIG. 4. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the navigation database 132, the performance database 134, the database 156, and optional disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 156 may be organized and/or imported from an external source 140 during an initialization step of a process (see initialization 601 FIG. 6).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 140 directly. The interface 154 may also include one or more network interfaces to communicate with technicians, and/or one or more storage interfaces to connect to storage apparatuses, such as the database 156.

During operation, the processor 150 loads and executes one or more programs, algorithms and rules embodied as instructions and applications 160 contained within the memory 152 and, as such, controls the general operation of the control module 104 as well as the system 102. In executing the process described herein, such as the method 600 of FIG. 6, the processor 150 specifically loads and executes the novel program 162. Additionally, the processor 150 is configured to, in accordance with the program 162: process received inputs (selectively, any combination of input from the set including the communication system 130, the sensor system 128, the navigation system 126, and user input provided via user input device 120); reference any of the databases (such as, the performance database 134, the navigation database 132, and the database 156); and, generate display commands that command and control the display system 122.

Figure 2:
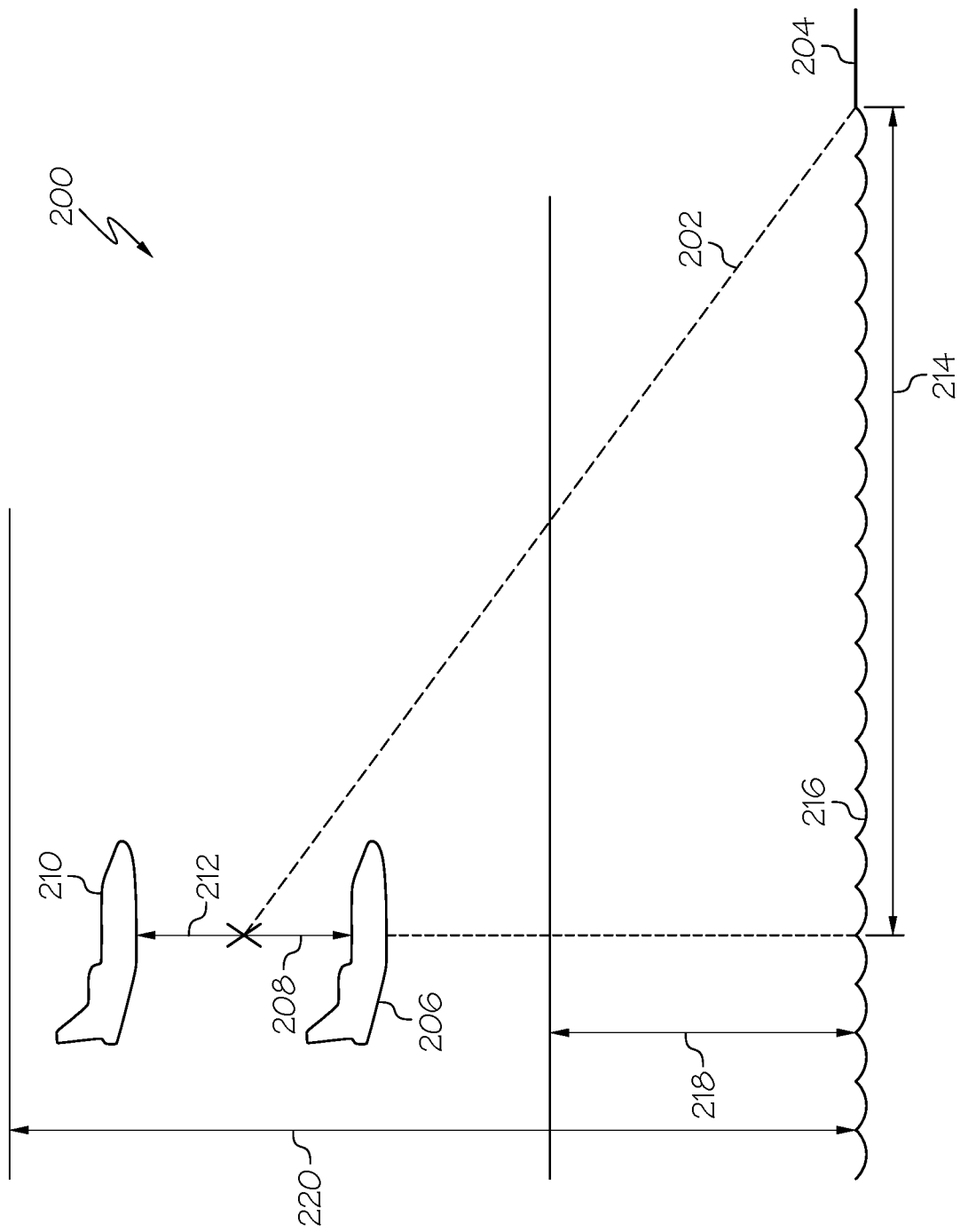
FIG. 2 is an image depicting aircraft that are not on the reference approach profile, in accordance with an exemplary embodiment.
Figure 3:
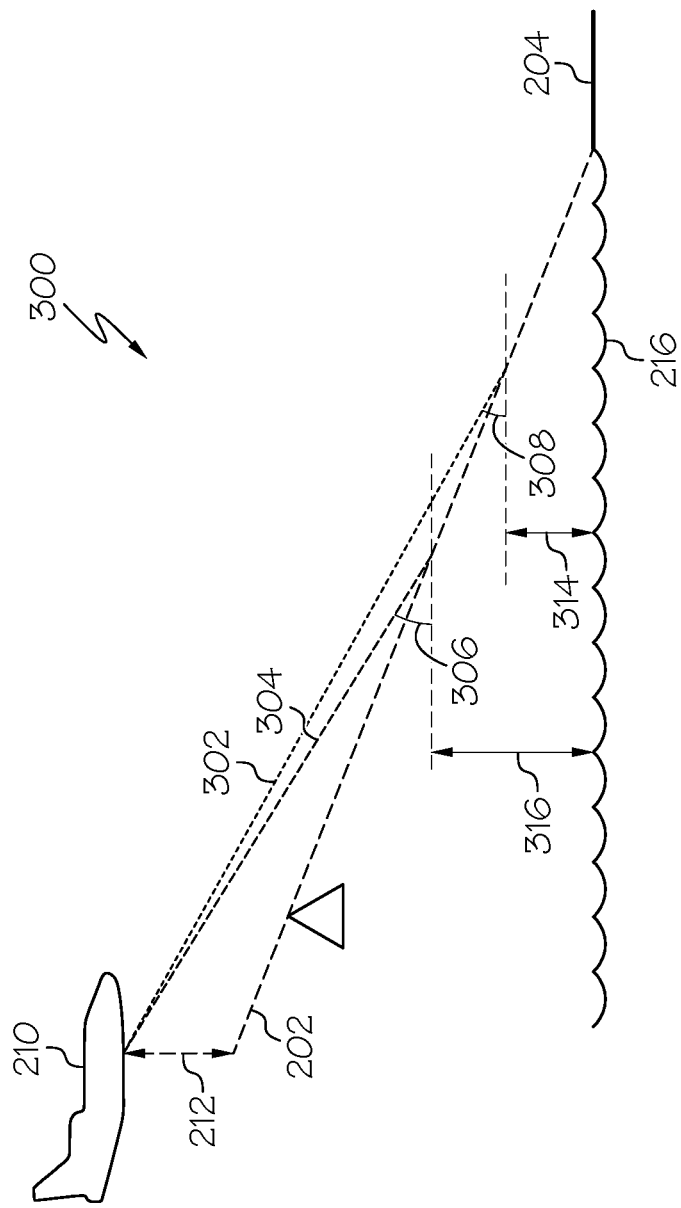
FIG. 3 is an image depicting aircraft final approach determinations made by the system of FIG. 1, in accordance with an exemplary embodiment.

Referring now to FIG. 2 and FIG. 3, and with continued reference to FIG. 1, image 200 depicts a published glide path (the reference approach profile 202) leading to a target landing location 204. A region of space that is of particular focus for an approach phase of flight is generally bounded by a longitudinal distance 214 from the target landing location 204, a lower altitude 218 (measured from ground 216), and an upper altitude 220. As depicted, aircraft 206 and aircraft 210 are each in this region. In an embodiment, the longitudinal distance 214 is about 10 nautical miles, the upper altitude 220 is about 4 thousand feet, and the lower altitude 218 is about 2 thousand feet, with "about" defined as plus or minus 2 percent.

Generally, the control module 104 continuously monitors received inputs to determine a current aircraft state defined by: a present position, location, orientation, and trajectory of the aircraft (100, 206, and 210). The current aircraft state is used to determine an "actual approach profile." The control module 104 compares the actual approach profile to the reference approach profile 202 to determine whether the aircraft is following the reference approach profile 202. Determining whether the aircraft is following the reference approach profile 202 comprises determining a predicted aircraft state at one of: a downpath altitude (i.e. generating an aircraft trajectory prediction to anticipate a future location on the descent), and a speed restriction, such as the target approach speed (Vapp). When the control module 104 determines that the aircraft is following the reference approach profile 202, it may command the display system 122 to display 'on path.'

When the control module 104 determines that the aircraft is not following the reference approach profile 202, it determines a deviation between the actual approach profile and the reference approach profile 202, and quantifies the deviation as a distance and a direction (above or below the reference approach profile). This is depicted in the image 200, aircraft 206 and aircraft 210 are within the range described above. Aircraft 206 is below the reference approach profile 202 by a deviation 208, and aircraft 210 is above the reference approach profile 202 by a deviation 212.

A deviation between the actual approach profile and the reference approach profile 202 indicate an unstable approach. When the approach is unstable, it is desirable to "recapture the path," which means determine approach stabilization criteria that provide the guidance as to whether and how to get the aircraft back on the assigned, reference approach profile 202. Responsive to determining that there is a deviation between the actual approach profile and the reference approach profile 202, the control module 104 determines approach stabilization criteria as follows. First, stabilization altitudes are selected. In the exemplary embodiments, the control module 104 determines or identifies an instrument meteorological conditions (IMC) stabilization altitude 316 and a visual meteorological conditions (VMC) stabilization altitude 314. In an embodiment, the IMC stabilization altitude 316 is one thousand feet and VMC stabilization altitude 314 is five hundred feet. In other embodiments, the IMC stabilization altitude 316 and VMC stabilization altitude 314 may have other values. Next, the approach stabilization criteria associated with the selected stabilization altitudes are determined. The approach stabilization criteria comprise: (i) a wind corrected air mass flight path angle (WC FPA) at the IMC; (ii) a vertical speed at the wind corrected air mass flight path angle (VS IMC); (iii) a wind corrected air mass flight path (WC FPA) angle at the VMC; and (iv) a vertical speed at the wind corrected air mass flight path angle (VS VMC). Vertical speed at a given stabilization altitude may be processed with a deceleration capability of the aircraft at a given wind corrected air mass flight path angle to make a determination that the criterion profile is stabilizing. The deceleration capability of an aircraft is based in part on the individual aircraft parameters, such as, but not limited to, aircraft weight and onboard equipment.

Using aircraft 210 as an example, the approach stabilization criteria are used to generate guidance information pertaining to the selected stabilization altitudes. Continuing with the example, an IMC criterion profile 304 and a VMC criterion profile 302 are determined. The IMC criterion profile 304 comprises WC FPA IMC 306 to restore aircraft 210 from its current position to the reference approach profile 202 at the IMC stabilization altitude 316. The VMC criterion profile 302 comprises WC FPA VMC 308 to restore aircraft 210 from its current position to the reference approach profile 202 the VMC stabilization altitude 314. These criterion profiles may be displayed on the display system 122, in an image such as that of FIG. 3.

As mentioned above, the determined approach stabilization criterion also comprise the vertical speed at the IMC stabilization altitude 316 (VS-IMC) and the vertical speed at the VMC stabilization altitude 314 (VS-VMC). The control module 104 determines, based on the approach stabilization criterion, whether (a) the IMC criterion profile 304 stabilizes the approach, and whether (b) the VMC criterion profile 302 stabilizes the approach. When conditions (a) and (b) occur concurrently, the approach is determined to be stable, and the control module 104 may display the approach stabilization criterion on the display system 122 for the user to review.

Figure 4:
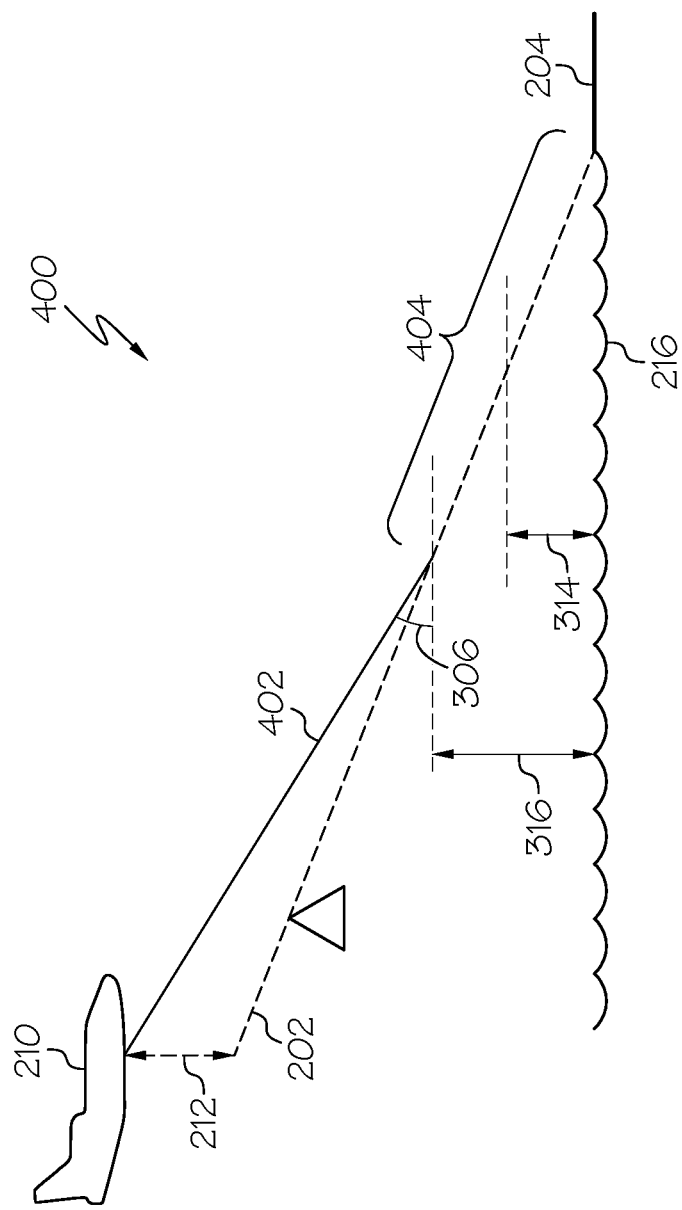
FIG. 4 is a final approach image generated by the system of FIG. 1, in accordance with an exemplary embodiment.
Figure 5:
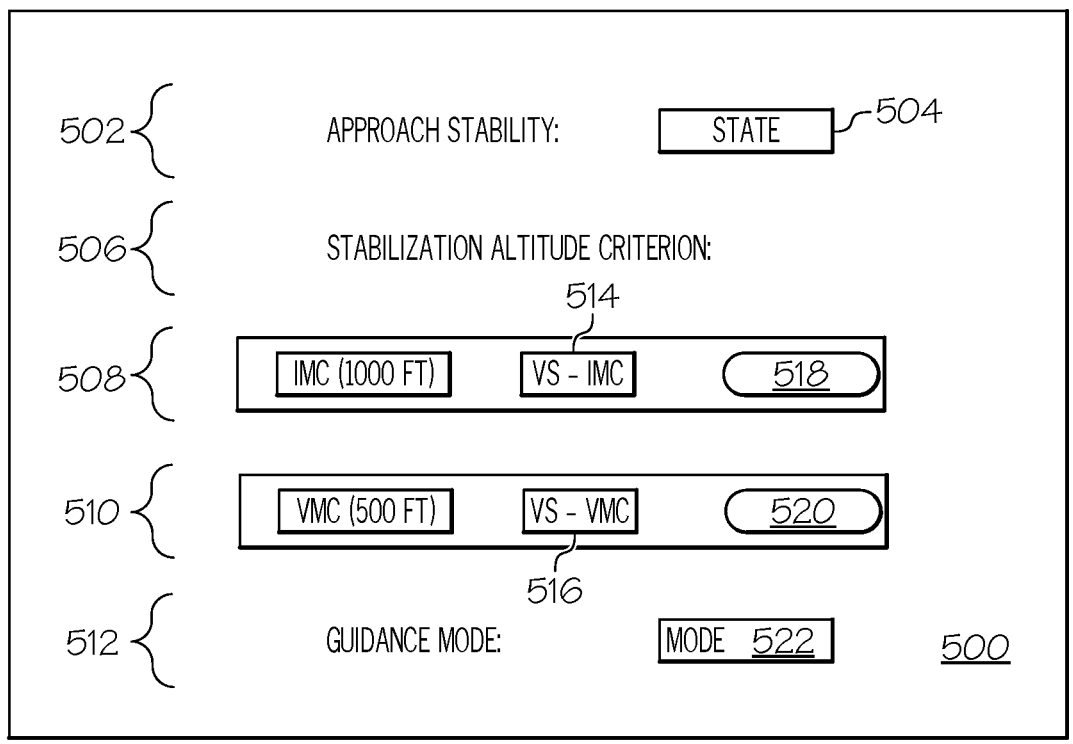
FIG. 5 is a graphical user interface display image depicting approach stabilization criterion generated by the system of FIG. 1, in accordance with an exemplary embodiment.

Turning now to FIGS. 4 and 5, and with continued reference to FIGS. 1-3, the determined approach stabilization criterion are organized and displayed as approach guidance information. In an exemplary embodiment, the approach stabilization criterion is presented as a displayed FMS page 500. In a first region 502, the approach stability is addressed, and a "state" region 504 may display "on path," "stable," or "unstable." A region 506 declares a title, "stabilization altitude criterion." Region 508 and 510 display stabilization criterion determined for the selected stabilization altitudes. Region 508 displays the IMC criterion profile, comprising: the IMC stabilization altitude 316 at 1000 feet; the vertical speed associated with the IMC (VS-IMC) 514; and an IMC selector button 518 for the user to activate the IMC criteria profile. Region 510 displays the VMC criterion profile, comprising: the VMC stabilization altitude 314 at 500 feet; the vertical speed associated with the VMC (VS-VMC) 516; and a VMC selector button 520 for the user to activate the VMC criteria profile. If an approach is unstable at state 504, then a vertical speed to achieve stabilization is determined, and the IMC selector button 518 and the VMC selector button 520 are essentially deactivated, i.e., pressing or attempting to select them will not activate the respective criteria profile.

In contrast, when the approach is stable at state 504, the user is permitted to select/activate the IMC selector button 518 and/or the VMC selector button 520 responsive to the respective stability determinations described above. The control module 104 is configured to receive a user selection and determine that it was subsequent to the display of the approach stabilization criterion described above. Responsive thereto, the control module 104 may generate an aircraft trajectory prediction using the selected criteria; and, command the display system 122 to render an image of the aircraft trajectory prediction and the user selection. For example, an image such as image 400 may be displayed on the display system 122 to depict the selection of the IMC criterion profile. On the image 400, the IMC criterion profile is subsequently highlighted 402, or otherwise distinguished from the published glide path or reference approach profile 202, and the VMC criterion profile 302 is removed. A section 404 represents a part of the published glide path or reference approach profile 202 that the aircraft 210 will be back on, subsequent to flying along the activated IMC criterion profile 402.

Figure 6:
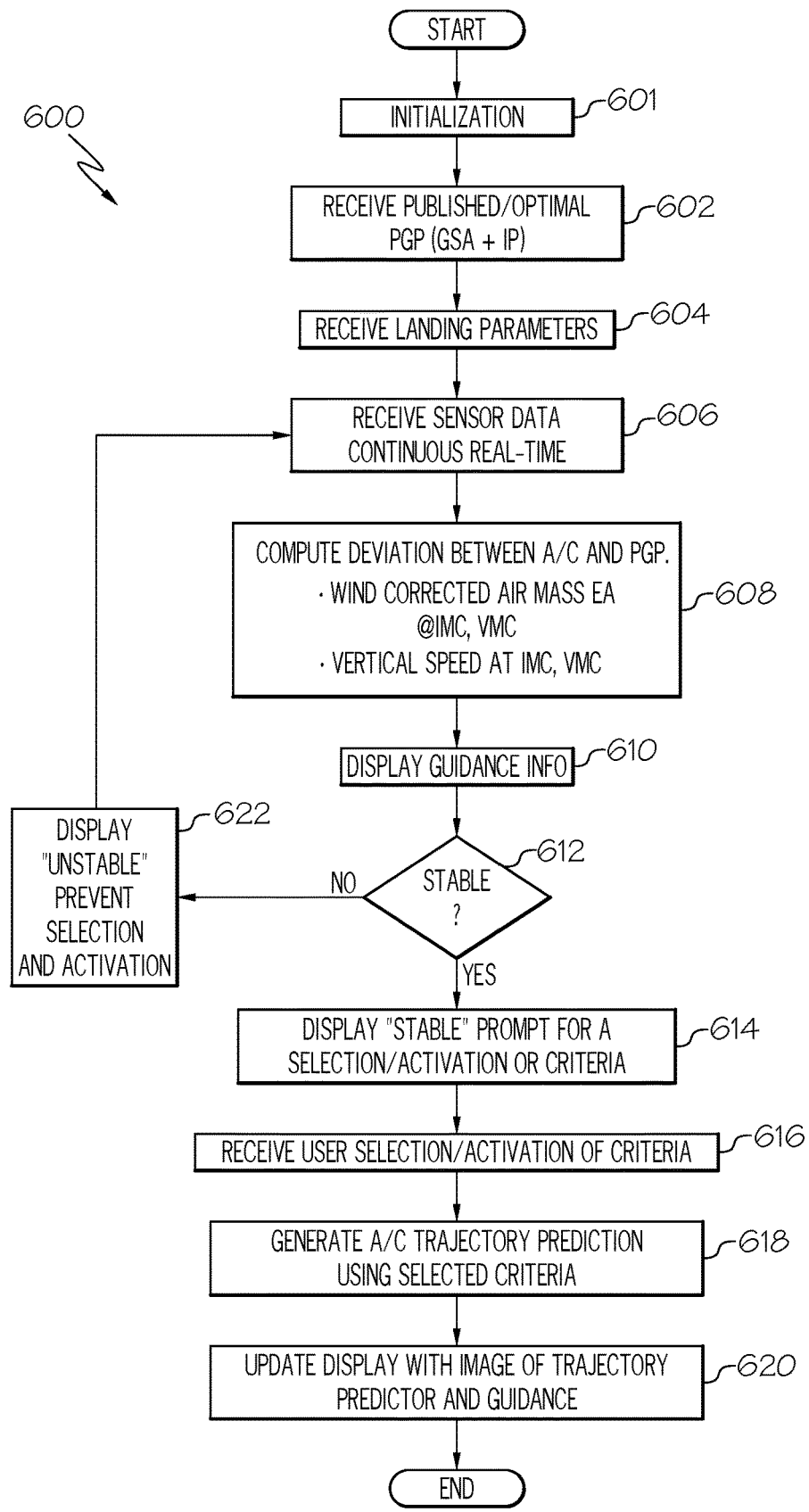
FIG. 6 is a flow chart for a method for approach stabilization, according to an exemplary embodiment.

In a further exemplary embodiment, the control module 104 discussed above may be used to implement a method 600 for approach stabilization, as shown in the flow chart of FIG. 6. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

The method starts, and at 601 the control module 104 is initialized. As mentioned above, initialization may comprise uploading or updating instructions and applications 160, program 162, stored variables 164, and the various lookup tables stored in the database 156. Examples of parameters that may be stored in stored variables 164 include: a VMC minimum, which is a configurable boundary between the IMC stabilization altitude 316 and VMC stabilization altitude 314, based on visibility, definitions for final approach, including the lateral distance 214 from the target landing area and associated altitude bands (218, 220), aircraft specific parameters for wind corrected air mass calculations, and thrust and drag calculations, and the like. Stored variables 164 may also include various shapes, sizes, and color rendering references for buttons and displays such as a graphical user interface (GUI) displayed on the FMS page 500, and the flight path images 300 and 400. In some embodiments, the program 162 includes additional instructions and rules for rendering information differently based on type of display device in display system 122.

At 602, a published arrival procedure (PAP), a published glide path (PGP), a target landing location 204, or runway, and a speed restriction or target approach airspeed (Vapp) may be received. These items may be part of a flight plan that was received by the control module 104 prior to flight, may be received during flight, or may be decided by crew and input, via the user input device 120, into the control module 104 during flight. The PGP includes a glide slope angle (GSA) and a flight path. At 604, landing parameters are received. Landing parameters may include standard operating procedures, the IMC stabilization altitude 316 and the VMC stabilization altitude 314. At 606, sensor data is received. Although sensor data is depicted as just being received at 606, in practice, it is continuously, and in real time, received and processed.

At 608, as may be directed by the instructions in program 162, the reference approach profile is determined, and an actual approach profile is determined. The actual approach profile is compared to the reference approach profile 202 to determine whether the aircraft 210 is following the reference approach profile 202. A deviation (208, 212) from the reference approach profile 202 is quantified, if present. The approach stabilization criterion described above is determined. In making the determinations at 608, the method 600 may reference any combination of the following: aircraft specific models from the performance database 134, flight plan information from the navigation database 132, navigational data from the navigation system 126, landing parameters, IMC stabilization altitude 316 and VMC stabilization altitude 314, and sensor data from the sensor system 128.

At 610 the approach stabilization criteria from 608 are displayed. At 612, the method 600 determines whether (a) the IMC criterion profile 304 stabilizes the approach, and whether (b) the VMC criterion profile 302 stabilizes the approach. Recall, determining whether a given criterion profile stabilizes the actual approach comprises processing the vertical speed at the respective WC FPA and an aircraft deceleration capability. At 614, upon the co-occurrence of (a) and (b), "stable" is displayed and user selection of IMC criterion profile at 518 and VMC criterion profile at 520 permitted. Alternatively, at 622, "unstable" is displayed, and user selection of IMC criterion profile at 518 and VMC criterion profile at 520 are prevented. At 616, the method receives a user selection/activation of a criterion profile, and at 618, the method generates an aircraft path/trajectory based on the user selection at 616. At 620, a displayed image 300 may be updated to displayed image 400, with the trajectory prediction from the selected criterion profile being visually distinguished 402 from the reference approach profile 202. If the aircraft has not landed at 620, the method may return to receiving information at 606, or end.

Accordingly, the exemplary embodiments discussed above enable a technologically enhanced FMS that provides approach guidance based on approach stabilization criteria. The exemplary embodiments determine approach stabilization criteria and display guidance information for a pilot or crew to review.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing approach stabilization guidance for an aircraft, the method comprising:
   at a control module,
   receiving a published arrival procedure (PAP) and a published glide path (PGP);
   receiving landing parameters comprising an instrument meteorological conditions (IMC) stabilization altitude, and a visual meteorological conditions (VMC) stabilization altitude;
   receiving real-time aircraft sensor data;
   processing the PAP, PGP, landing parameters, and sensor data, to determine
      a reference approach profile,
      an actual approach profile,
      whether the aircraft is following the reference approach profile, and
      approach stabilization criterion comprising each of: (i) a wind corrected air mass flight path angle (WC FPA) at the IMC stabilization altitude, (ii) a vertical speed at the wind corrected air mass flight path angle at the IMC stabilization altitude (VS IMC), (iii) a wind corrected air mass flight path angle (WC FPA) at the VMC stabilization altitude, and (iv) a vertical speed at the wind corrected air mass flight path angle at the VMC stabilization altitude (VS VMC);
   commanding a display system to display a flight management system (FMS) page having thereon an alphanumeric indication of each of (i) an IMC criterion profile comprising the VS IMC and (ii) a VMC criterion profile comprising the VS VMC;
   determining, based on the VS IMC and an aircraft deceleration capability, whether the IMC criterion profile stabilizes the actual approach profile;
   determining, based on the VS VMC and the aircraft deceleration capability, whether the VMC criterion profile stabilizes the actual approach profile; and
   when both the IMC criterion profile stabilizes the actual approach profile and the VMC criterion profile stabilizes the actual approach profile:
      commanding the display system to display "stable"; and
      allowing user selections of the IMC criterion profile and the VMC criterion profile.

2. The method of claim 1, wherein determining whether the aircraft is following the reference approach profile comprises determining a predicted aircraft state at one of: a downpath altitude, and a speed restriction.

3. The method of claim 1, further comprising:
   commanding the display system to further display on the IMC criterion the IMC stabilization altitude and an IMC selector button for activating the IMC criteria profile.

4. The method of claim 3, further comprising:
   commanding the display system to further display on the VMC criterion profile the VMC stabilization altitude and a VMC selector button for activating the VMC criteria profile.

5. The method of claim 4, further comprising:
   receiving a user selection of the IMC criterion profile or the VMC criterion profile;
   generating an aircraft trajectory prediction using the user selection; and
   commanding the display system to render an image of the aircraft trajectory prediction and the user selection.

6. The method of claim 5, further comprising:
   when the IMC criterion profile and the VMC criterion profile do not, concurrently, stabilize the actual approach profile,
      commanding the display system to prompt "unstable"; and
      preventing user selections of either the IMC criterion profile or the VMC criterion profile.

7. The method of claim 6, further comprising: subsequent to commanding the display system to prompt "unstable," determining and displaying a target vertical speed to stabilize.

8. A control module for an enhanced flight management system on an aircraft, comprising:
   a memory device; and
   a processor coupled to the memory device, the processor configured to:
      receive a flight plan comprising published arrival procedures (PAP), and a published glide path (PGP);
      receive landing parameters comprising an instrument meteorological conditions (IMC) stabilization altitude, and a visual meteorological conditions (VMC) stabilization altitude;
      process the flight plan and landing parameters with aircraft specific data, and real-time sensor data to determine
         whether the aircraft has an actual approach profile that is following a reference approach profile, and
         approach stabilization criterion comprising: (i) a wind corrected air mass flight path angle (WC FPA) at the IMC stabilization altitude, (ii) a vertical speed at the wind corrected air mass flight path angle at the IMC stabilization altitude (VS IMC), (iii) a wind corrected air mass flight path angle (WC FPA) at the VMC stabilization altitude, and (iv) a vertical speed at the wind corrected air mass flight path angle at the VMC stabilization altitude (VS VMC);
      command a display system to display on a vertical display, a vertical indication of the reference approach profile, an IMC criterion profile comprising the VS IMC, and a VMC criterion profile comprising the VS VMC;

determine, based on the VS IMC, whether the IMC criterion profile stabilizes the actual approach profile;

determine, based on the VS VMC, whether the VMC criterion profile stabilizes the actual approach profile; and when both the IMC criterion profile stabilizes the actual approach profile and the VMC criterion profile stabilizes the actual approach profile, commanding a display system to display "stable".

9. The control module of claim 8, wherein the processor is further configured to:

allow user selections of the IMC criterion profile and the VMC criterion profile when both the IMC criterion profile stabilizes the actual approach profile and the VMC criterion profile stabilizes the actual approach profile.

10. The control module of claim 9, wherein the processor is further configured to determine a predicted aircraft state at one of: a downpath altitude, and a speed restriction.

11. The control module of claim 10, wherein the processor is further configured to: when the aircraft is following the reference approach profile, command the display system to display "on path".

12. The control module of claim 10, wherein the processor is further configured to:

when the IMC criterion profile and the VMC criterion profile do not, concurrently, stabilize the actual approach profile, command the display system to prompt "unstable"; and prevent user selections of either the IMC criterion profile or the VMC criterion profile.

13. The control module of claim 12, wherein the processor is further configured to: subsequent to commanding the display system to prompt "unstable," determine a target vertical speed to stabilize.

14. The control module of claim 12, wherein the processor is further configured to: subsequent to commanding the display system to prompt "stable," command the display system to display an IMC selector button for activating the IMC criteria profile.

15. The control module of claim 14, wherein the processor is further configured to:

subsequent to commanding the display system to prompt "stable," command the display system to display a VMC selector button for activating the VMC criteria profile.

16. The control module of claim 15, wherein the processor is further configured to:

determine that (i) a user input indicates a user selection of one of the IMC criterion profile and the VMC criterion profile, and (ii) the user input was received subsequent to commanding the display system to display the IMC criterion profile and the VMC criterion profile; and visually distinguishing the user selected criterion profile from the unselected criterion profile.

17. The control module of claim 16, wherein the processor is further configured to:

generate an aircraft trajectory prediction using the user selection; and command the display system to render an image of the aircraft trajectory prediction and the user selection.

* * * * *